(12) United States Patent
Kim

(10) Patent No.: US 11,584,360 B2
(45) Date of Patent: Feb. 21, 2023

(54) TRACTION CONTROL DEVICE AND METHOD FOR FOUR-WHEEL DRIVE ELECTRIC VEHICLE

(71) Applicants: HYUNDAI MOTOR COMPANY, Seoul (KR); KIA MOTORS CORPORATION, Seoul (KR)

(72) Inventor: Gwi Chui Kim, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 229 days.

(21) Appl. No.: 17/026,646

(22) Filed: Sep. 21, 2020

(65) Prior Publication Data

US 2021/0107456 A1    Apr. 15, 2021

(30) Foreign Application Priority Data

Oct. 15, 2019 (KR) .................. 10-2019-0127390

(51) Int. Cl.
*B60W 30/02* (2012.01)
*B60K 1/02* (2006.01)
(Continued)

(52) U.S. Cl.
CPC .............. *B60W 30/02* (2013.01); *B60K 1/02* (2013.01); *B60K 17/356* (2013.01);
(Continued)

(58) Field of Classification Search
CPC .... B60W 30/02; B60W 10/119; B60W 10/18; B60W 2300/18; B60W 2510/083; B60W 2520/30; B60W 2710/083; B60W 2720/30; B60W 30/18172; B60W 10/08; B60K 1/02; B60K 17/356; B60K 23/0808; B60K 2023/0858; B60K 2001/001; B60K 1/00; B60K 2023/0825; B60K 23/08; B60K 17/354; B60K 7/0007; B60L 15/20; B60L 2220/42; B60L 2240/423; B60L 2240/465; B60L 2260/26; B60L 3/102; B60L 3/108; B60L 15/2009; B60L 3/0015; B60L 15/2072; B60L 50/60; B60L 2240/463; B60Y 2200/91; B60Y 2400/82; B60Y 2300/02; Y02T 10/64; Y02T 10/70; Y02T 10/72
See application file for complete search history.

(56) References Cited

U.S. PATENT DOCUMENTS

| | | | | |
|---|---|---|---|---|
| 2004/0082433 | A1* | 4/2004 | Williams | B60K 6/547 903/914 |
| 2007/0193808 | A1* | 8/2007 | Perakes | B60W 20/10 180/65.265 |
| 2011/0172863 | A1* | 7/2011 | Yu | G16Z 99/00 180/65.285 |

FOREIGN PATENT DOCUMENTS

| | | | | |
|---|---|---|---|---|
| CN | 103373215 | A * | 10/2013 | B60K 6/24 |
| CN | 108216182 | A * | 6/2018 | B60K 17/348 |

(Continued)

*Primary Examiner* — Justin Holmes
(74) *Attorney, Agent, or Firm* — Lempia Summerfield Katz LLC

(57) ABSTRACT

A traction control device and method for a four-wheel drive electric vehicle are disclosed. When the drive wheels of an electric vehicle spin, a drive force of the electric vehicle is controlled so as to restrain the spinning of the drive wheels and to secure the starting performance and acceleration performance of the electric vehicle.

14 Claims, 5 Drawing Sheets

(51) Int. Cl.
*B60K 23/08* (2006.01)
*B60K 17/356* (2006.01)
*B60W 10/119* (2012.01)
*B60W 10/18* (2012.01)
*B60L 15/20* (2006.01)

(52) U.S. Cl.
CPC .......... *B60K 23/0808* (2013.01); *B60L 15/20* (2013.01); *B60W 10/119* (2013.01); *B60W 10/18* (2013.01); *B60K 2023/0858* (2013.01); *B60Y 2200/91* (2013.01); *B60Y 2400/82* (2013.01)

(56) References Cited

FOREIGN PATENT DOCUMENTS

| | | | |
|---|---|---|---|
| JP | 6203404 | B2 | 9/2017 |
| KR | 10-2016-0045832 | A | 4/2016 |
| KR | 10-2016-0127743 | A | 11/2016 |

* cited by examiner

TRACTION CONTROL DEVICE AND METHOD FOR FOUR-WHEEL DRIVE ELECTRIC VEHICLE

CROSS-REFERENCE TO RELATED APPLICATION

This application claims priority to and the benefit of Korean Patent Application No. 10-2019-0127390, filed on Oct. 15, 2019, the entire contents of which are incorporated herein by reference.

FIELD

The present disclosure relates to a traction control device and method for a four-wheel drive electric vehicle. More particularly, it relates to a traction control device and method for controlling drive force of the drive wheels of a vehicle.

BACKGROUND

The statements in this section merely provide background information related to the present disclosure and may not constitute prior art.

In general, as one of the systems for improving the stability of a vehicle while driving, there is a traction control system (TCS), which controls drive force when the vehicle starts or accelerates suddenly and thus prevents slippage or spinning of the wheels of the vehicle.

Specifically, the TCS is a system that prevents slippage or spinning of the drive wheels when a vehicle starts or accelerates, thereby preventing poor traction of the vehicle and improving the starting performance and acceleration performance of the vehicle.

When the drive wheels of a vehicle slip or spin due to excessive drive force of the vehicle during starting or acceleration thereof, a conventional TCS controls the speed of the drive wheels by reducing the drive force (drive torque) of the vehicle.

However, we have discovered that when the TCS operates during travel of the vehicle, the drive force of the vehicle may be reduced, and thus the starting performance and acceleration performance of the vehicle may be deteriorated. In particular, while the vehicle is traveling uphill, the reduction in the drive force of the vehicle due to the operation of the TCS and the resultant deterioration in the starting performance and acceleration performance of the vehicle may cause a serious problem such as an accident.

SUMMARY

The present disclosure provides a traction control device and method for a four-wheel drive electric vehicle for controlling drive force in the event of spinning of the drive wheels of a vehicle, thereby restraining the spinning of the drive wheels and securing the starting performance and acceleration performance of the vehicle.

In one aspect of the present disclosure, a traction control device for a four-wheel drive electric vehicle includes: a first motor configured to supply a drive torque to main drive wheels of a four-wheel drive electric vehicle; a second motor configured to supply a drive torque to auxiliary drive wheels of the electric vehicle; a disconnector provided at an axle of the auxiliary drive wheels, the disconnector being configured to connect the auxiliary drive wheels and the second motor to each other so as to permit power transmission therebetween or to disconnect the auxiliary drive wheels and the second motor from each other so as to interrupt power transmission therebetween; and a traction controller configured to control the first motor and the second motor. In particular, when the main drive wheels spin during travel of the electric vehicle in the state in which the auxiliary drive wheels and the second motor are connected to each other by the disconnector, the traction controller reduces the drive torque of the main drive wheels and increases the drive torque of the auxiliary drive wheels in proportion to the amount of reduction in the drive torque of the main drive wheels.

In one form, when the main drive wheels spin during travel of the electric vehicle in the state in which the disconnector is disengaged, the traction controller may reduce the drive torque of the main drive wheels, and may engage the disconnector such that the drive torque is supplied to the auxiliary drive wheels.

In another form, when the amount of spinning of the main drive wheels is equal to or greater than a predetermined first threshold level and the amount of spinning of the auxiliary drive wheels is equal to or greater than a predetermined second threshold level after the disconnector is engaged, the traction controller may control the first motor to reduce the drive torque of the main drive wheels and may control the second motor to reduce the drive torque of the auxiliary drive wheels.

In still another form, the traction controller may include a brake controller configured to determine required torque of the first motor (first required torque) and required torque of the second motor (second required torque), and a motor controller configured to control torque of the first motor to realize the first required torque and control torque of the second motor to realize the second required torque.

In yet another form, when the amount of spinning of the main drive wheels is less than the first threshold level and the amount of spinning of the auxiliary drive wheels is less than the second threshold level after the disconnector is engaged, the brake controller may inform the motor controller that a command including information about the first required torque and the second required torque will not be transmitted to the motor controller.

In another aspect of the present disclosure, a traction control method for a four-wheel drive electric vehicle includes: determining, by a brake controller, whether main drive wheels driven by a first motor are spinning during travel of a four-wheel drive electric vehicle; upon determining that the main drive wheels are spinning, reducing, by the brake controller, torque of the first motor and determining whether the electric vehicle is traveling in a two-wheel-drive mode; upon determining that the electric vehicle is traveling in the two-wheel-drive mode, engaging a disconnector provided at an axle of auxiliary drive wheels such that the auxiliary drive wheels are connected to a second motor to receive torque from the second motor; and upon determining that the main drive wheels, among the main drive wheels and the auxiliary drive wheels, are spinning, reducing, by the brake controller, the torque of the first motor and increasing the torque of the second motor in proportion to the amount of reduction in the torque of the first motor.

In one form, the traction control method may further include, upon determining that the amount of spinning of the main drive wheels is equal to or greater than a predetermined first threshold level and the amount of spinning of the auxiliary drive wheels is equal to or greater than a predetermined second threshold level after engaging the disconnector, controlling, by the brake controller, the first motor to reduce drive torque of the main drive wheels and controlling the second motor to reduce drive torque of the auxiliary drive wheels. In this case, the first motor may be controlled by a motor controller so as to realize a first required torque determined by a brake controller, and the second motor may be controlled by the motor controller so as to realize a second required torque determined by the brake controller.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
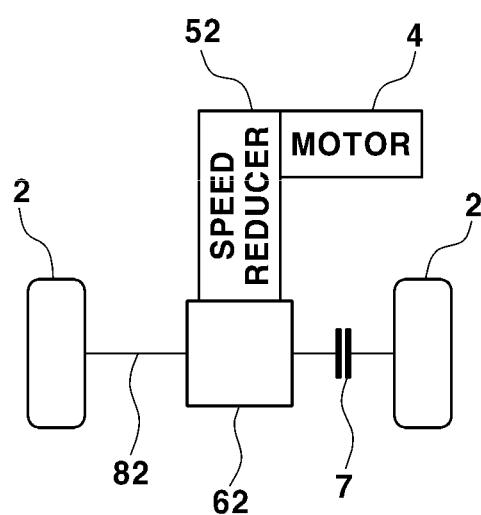
FIG. 1 is a view showing a disconnector of a four-wheel drive electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, reference will now be made in detail to the exemplary forms of the present disclosure, examples of which are illustrated in the accompanying drawings.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, will be determined in part by the particular intended application and use environment.

In general, when a four-wheel drive electric vehicle travels in a two-wheel-drive mode, in which main drive wheels are driven and auxiliary drive wheels are not driven, reverse drive force is transmitted to a speed reducer through the auxiliary drive wheels, and thus drag loss occurs.

Figure 2:
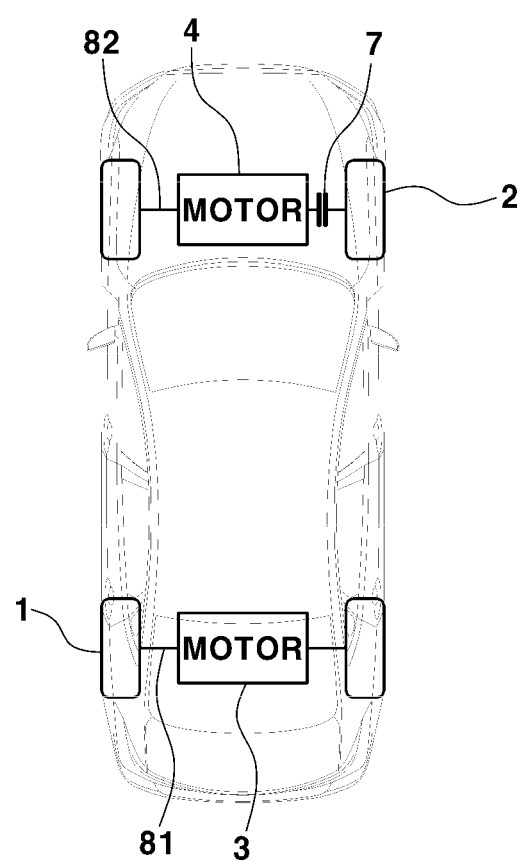
FIG. 2 is a view showing a rear-wheel-drive-based four-wheel drive electric vehicle.

Referring to FIGS. 1 and 2, the four-wheel drive electric vehicle is configured such that a disconnector 7 is provided at an axle 82 in order to prevent reverse drive force from being transmitted to a speed reducer 52 through front wheels 2, thereby inhibiting or preventing the occurrence of drag loss.

The disconnector 7 may be implemented as a dog-clutch-type disconnector. The speed reducer 52 may be connected to the axle 82 via a differential gear 62.

As shown in FIG. 2, a four-wheel drive electric vehicle may include a front motor 4 for driving the front wheels 2 and a rear motor for driving the rear wheels 1. When the four-wheel drive electric vehicle employs a rear-wheel-drive-based four-wheel drive system, the disconnector 7 may be installed on the front axle 82.

When the disconnector 7 is in an engaged state, the vehicle is driven in a four-wheel-drive mode, and when the disconnector 7 is in a disengaged state, the vehicle is driven in a two-wheel-drive mode. The engaged state of the disconnector 7 is the state in which power transmission is permitted, and the disengaged state of the disconnector 7 is the state in which power transmission is interrupted.

In one form of the present disclosure, a traction control device controls the drive torque of the drive wheels when the drive wheels spin while a rear-wheel-drive-based four-wheel drive electric vehicle is traveling, thereby restraining the spinning of the drive wheels and thus securing the starting performance and acceleration performance of the vehicle.

To this end, during the operation of a traction control system (TCS) for restraining wheel spin, the traction control device performs traction control without incurring a reduction in the total drive torque, which is the sum of the drive torque of the front wheels and the drive torque of the rear wheels, or performs traction control while minimizing a reduction in the total drive torque.

The operations of the method or the algorithm described in connection with the forms disclosed herein may be embodied directly in a hardware (e.g., a processor) or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM.

During the operation of the TCS, the traction control may be performed in order to control the drive force (drive torque) of the vehicle when the vehicle starts or accelerates, thereby inhibiting or preventing slippage or spinning of the drive wheels.

Figure 3:
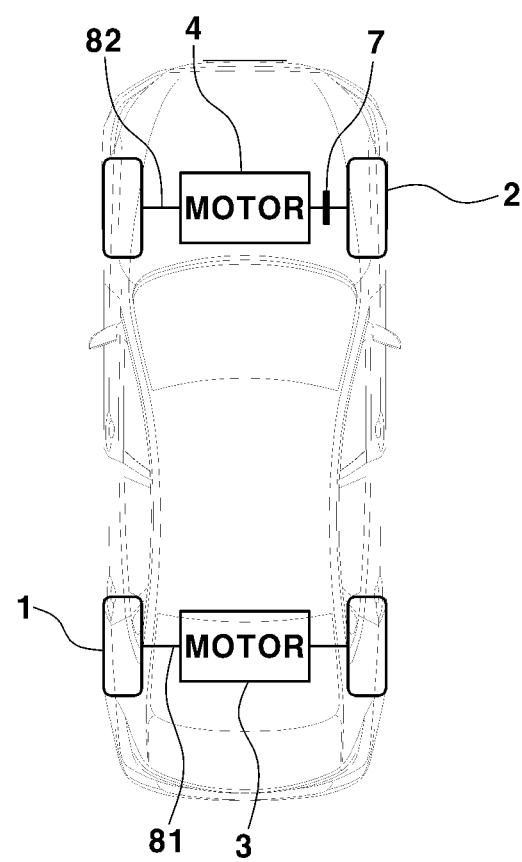
FIG. 3 is a view showing a rear-wheel-drive-based four-wheel drive electric vehicle when a front disconnector is in an engaged state.

As shown in FIGS. 2 and 3, in the case of a rear-wheel-drive-based four-wheel drive electric vehicle, the rear wheels 1 are main drive wheels, and the front wheels 2 are auxiliary drive wheels.

The four-wheel drive electric vehicle includes a front motor 4 for driving the front wheels 2 and a rear motor 3 for driving the rear wheels 1. The rear motor 3 may be referred to as a first motor, and the front motor 4 may be referred to as a second motor.

Figure 4:
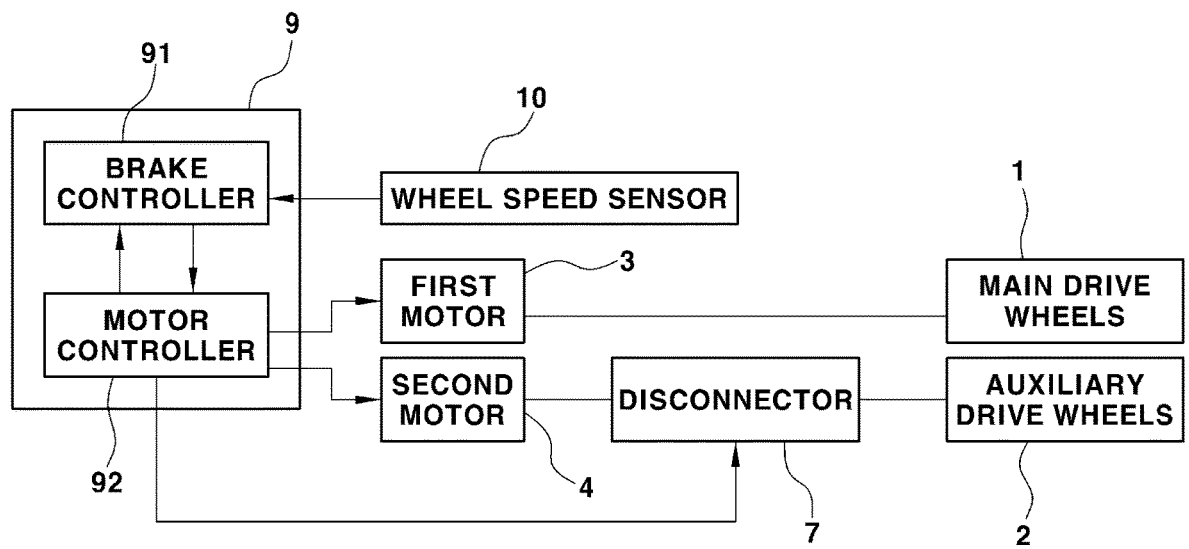
FIG. 4 is a view showing a traction control device.

Referring to FIG. 4, the front motor 4 and the rear motor 3 are operated so as to realize the required torque under the command of a brake controller 91. When the drive wheels spin during travel of the vehicle, the brake controller 91 calculates and determines the optimum required torque for restraining the wheel spin, and transmits a command including information about the required torque to a motor controller 92.

The brake controller 91 may determine the required torque of the front motor 4 and the required torque of the rear motor 3, and may transmit a command including information about the required torque of the front motor 4 and a command including information about the required torque of the rear motor 3 to the motor controller 92.

The brake controller 91 is a controller that controls the overall operation of an integrated electric brake (IEB) provided in the vehicle, and the IEB is a brake device configured to generate braking force to brake the drive wheels.

The motor controller 92 is a controller that controls the overall operation of the front motor 4 and the rear motor 3. The motor controller 92 may be referred to as a vehicle control unit (VCU) that controls the drive source of the vehicle.

The motor controller 92 controls the front motor 4 and the rear motor 3 to realize their respective required torques.

The front motor 4 is configured to generate drive torque that is supplied to the front wheels 2. That is, the front motor 4 generates torque for driving the front wheels 2 and supplies the torque to the front wheels 2. To this end, the front motor 4 is connected to the front axle 82 via the front speed reducer 52 and the front differential gear 62, and is connected to the front wheels 2 via the front axle 82.

As shown in FIGS. 1 to 3, the disconnector 7 is installed on the front axle 82 so as to control power transmission between the front motor 4 and the front wheels 2. When the disconnector 7 is in an engaged state, the torque of the front motor 4 is transmitted to the front wheels 2, but when the disconnector 7 is in a disengaged state, the transmission of the torque of the front motor 4 to the front wheels 2 is interrupted. In other words, the disconnector 7 may connect the front wheels 2 and the front motor 4 to each other so as to permit power transmission therebetween, or may disconnect the front wheels 2 and the front motor 4 from each other so as to interrupt power transmission therebetween.

Figure 5:
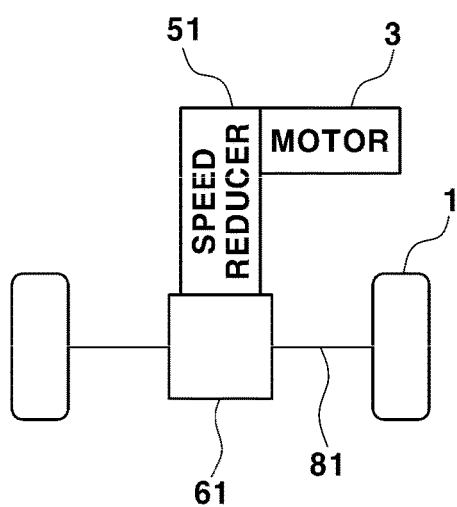
FIG. 5 is a view showing the connection structure between a rear motor and rear wheels.

As shown in FIGS. 3 and 5, the rear motor 3 is configured to generate drive torque that is supplied to the rear wheels 1. That is, the rear motor 3 generates torque for driving the rear wheels 1 and supplies the torque to the rear wheels 1. To this end, the rear motor 3 is connected to a rear axle 81 via a rear speed reducer 51 and a rear differential gear 61, and is connected to the rear wheels 1 via the rear axle 81. No disconnector is installed on the rear axle 81.

When wheel spin occurs, the drive torque of the rear wheels 1 and the drive torque of the front wheels 2 may be controlled in response to a command from the brake controller 91.

For example, the brake controller 91 may request a reduction in the drive torque supplied from the rear motor 3 to the rear wheels 1 based on the amount of spinning of the rear wheels 1, and may request an increase in the drive torque supplied from the front motor 4 to the front wheels 2 based on the amount of reduction in the drive torque of the rear motor 3. In addition, the brake controller 91 may request a reduction in the drive torque supplied from the front motor 4 to the front wheels 2 based on the amount of spinning of the front wheels 2.

The brake controller 91 may control the torque of the front motor 4 and the torque of the rear motor 3 through the motor controller 92. In other words, the brake controller 91 may request the motor controller 92 to control the torque of the front motor 4 and the torque of the rear motor 3.

When only the rear wheels 1, among the front wheels 2 and the rear wheels 1, spin at a predetermined threshold rate or a higher rate than the predetermined threshold rate during travel of the vehicle, the brake controller 91 requests the motor controller 92 to reduce the drive torque of the rear wheels 1 and to increase the drive torque of the front wheels 2 in proportion to the amount of reduction in the drive torque of the rear wheels 1. The threshold rate may be set in advance through experimentation.

In other words, when only the rear wheels 1 spin at the threshold rate or the higher rate, the motor controller 92 reduces the current torque of the rear motor 3 and increases the current torque of the front motor 4 in proportion to the amount of reduction in the torque of the rear motor 3 in response to a request from the brake controller 91. In this case, the amount of reduction in the torque of the rear motor 3 may be determined based on the amount of spinning of the rear wheels 1.

As such, since the drive torque of the front wheels 2 is increased in proportion to the amount of reduction in the drive torque of the rear wheels 1, a reduction in the total drive torque, which is the sum of the drive torque of the rear wheels 1 and the drive torque of the front wheels 2, may be prevented or minimized. As a result, it is possible to secure driving stability of the vehicle and to prevent or minimize the deterioration in the starting performance and acceleration performance of the vehicle in the event of slippage or spinning of the drive wheels.

The amount of increase in the drive torque of the front wheels 2 may be set to be equal to the amount of reduction in the drive torque of the rear wheels 1 or may be set to be less than the amount of reduction in the drive torque of the rear wheels 1. That is, the amount of increase in the drive torque of the front wheels 2 may be equal to or less than the amount of reduction in the drive torque of the rear wheels 1.

The amount of increase in the drive torque of the front wheels 2 may have a predetermined ratio relative to the amount of reduction in the drive torque of the rear wheels 1. In this case, the ratio of the amount of increase in the drive torque of the front wheels 2 to the amount of reduction in the drive torque of the rear wheels 1 may be set in advance through experimentation.

The brake controller 91 may determine the amount of reduction in the drive torque of the rear wheels 1 based on the amount of spinning of the rear wheels 1. That is, the brake controller 91 may determine the required torque of the rear motor 3 based on the amount of spinning of the rear wheels 1, the vehicle speed, and the like. The brake controller 91 may determine the required torque of the rear motor 3 as a value obtained by subtracting the amount of reduction in the drive torque of the rear wheels 1 from the current drive torque of the rear wheels 1. That is, when the rear wheels 1 spin, the required torque of the rear motor 3 may be determined as a value obtained by subtracting the amount of reduction in the drive torque of the rear wheels 1, which is determined based on the amount of spinning of the rear wheels 1, from the current drive torque of the rear wheels 1. The current drive torque may be determined based on the current vehicle speed and the like.

The motor controller 92 controls the output torque of the rear motor 3 so as to realize the required torque. The motor controller 92 may control the output torque of the rear motor 3 in a feedback control manner.

Upon detecting the spinning of the drive wheels during travel of the vehicle in a two-wheel-drive mode, the brake controller 91 requests the motor controller 92 to engage the disconnector 7.

When the wheel speed of the drive wheels is a predetermined level or more greater than the vehicle speed, which is calculated based on the wheel speed of the front wheels 2 and the wheel speed of the rear wheels 1, the brake controller 91 determines that the drive wheels are spinning. The amount of spinning of the drive wheels may be calculated based on the difference between the vehicle speed and the wheel speed of the drive wheels. The wheel speed of each wheel may be detected by a wheel speed sensor 10.

The motor controller 92 controls the disconnector 7 to change to an engaged state in response to a request from the brake controller 91, and thereafter transmits a signal including information about the engaged state of the disconnector 7 to the brake controller 91. When engagement of the disconnector 7 is completed, the drive mode of the vehicle is changed from the two-wheel-drive mode to the four-wheel-drive mode.

When the engagement of the disconnector 7 is completed, the brake controller 91 individually calculates the required torque of the front motor 4 and the required torque of the rear motor 3 and requests the motor controller 92 to realize the required torques. In this case, the required torque of the rear motor 3 may be referred to as a first required torque, and the required torque of the front motor 4 may be referred to as a second required torque.

In addition, upon determining that both the front wheels 2 and the rear wheels 1 are spinning, the brake controller 91 may request the motor controller 92 to individually reduce the torque of the front motor 4 and the torque of the rear motor 3.

In other words, when the amount of spinning of the front wheels 2 is equal to or greater than a front-wheel threshold level and the amount of spinning of the rear wheels 1 is equal to or greater than a rear-wheel threshold level, the brake controller 91 may request the motor controller 92 to realize the required torque of the front motor 4 and the required torque of the rear motor 3 individually. The motor controller 92 controls the output torque of the front motor 4 and the output torque of the rear motor 3 so as to realize the required torque of the front motor 4 and the required torque of the rear motor 3 in response to a request from the brake controller 91.

Here, the rear-wheel threshold level and the front-wheel threshold level may be set in advance through experimentation. The rear-wheel threshold level and the front-wheel threshold level may be set to be different from each other. The rear-wheel threshold level may be referred to as a first threshold level, and the front-wheel threshold level may be referred to as a second threshold level.

The required torque of the front motor 4 and the required torque of the rear motor 3 may be set differently from each other. The amount of reduction in the torque of the front motor 4 and the amount of reduction in the torque of the rear motor 3 may be respectively optimized by independently controlling the output torque of the front motor 4 and the output torque of the rear motor 3, and thus deterioration in the starting performance and acceleration performance of the vehicle may be minimized.

After the disconnector 7 is engaged, when the amount of spinning of the rear wheels 1 becomes less than the rear-wheel threshold level and the amount of spinning of the front wheels 2 becomes less than the front-wheel threshold level, the brake controller 91 terminates the traction control for restraining the spinning of the drive wheels.

When traction control is performed, the motor controller 92 controls the torque of the front motor 4 and the torque of the rear motor 3 in response to a request from the brake controller 91. When the traction control is finished, the motor controller 92 controls the front motor 4 and the rear motor 3 based on vehicle driving state information including vehicle speed information. That is, when the traction control is finished, the vehicle is driven in a normal drive mode.

When terminating the traction control, the brake controller 91 transmits a signal indicating the termination of the traction control to the motor controller 92. That is, when terminating the traction control, the brake controller 91 informs the motor controller 92 that a command including information about the required torques of the motors will not be transmitted to the motor controller 92. Upon perceiving that a command including information about the required torques is not transmitted from the brake controller 91 any longer, the motor controller 92 controls the front motor 4 and the rear motor 3 based on the vehicle driving state information.

Here, the brake controller 91 and the motor controller 92 may constitute a traction controller 9 for performing traction control. In other words, the traction controller 9 may include the brake controller 91 and the motor controller 92. When the drive wheels spin during travel of the vehicle, the traction controller 9 performs traction control of restraining wheel spin by controlling the operation of the front motor 4 and the operation of the rear motor 3.

Hereinafter, a traction control process for restraining wheel spin of a four-wheel drive electric vehicle will be described with reference to FIG. 6.

Figure 6:
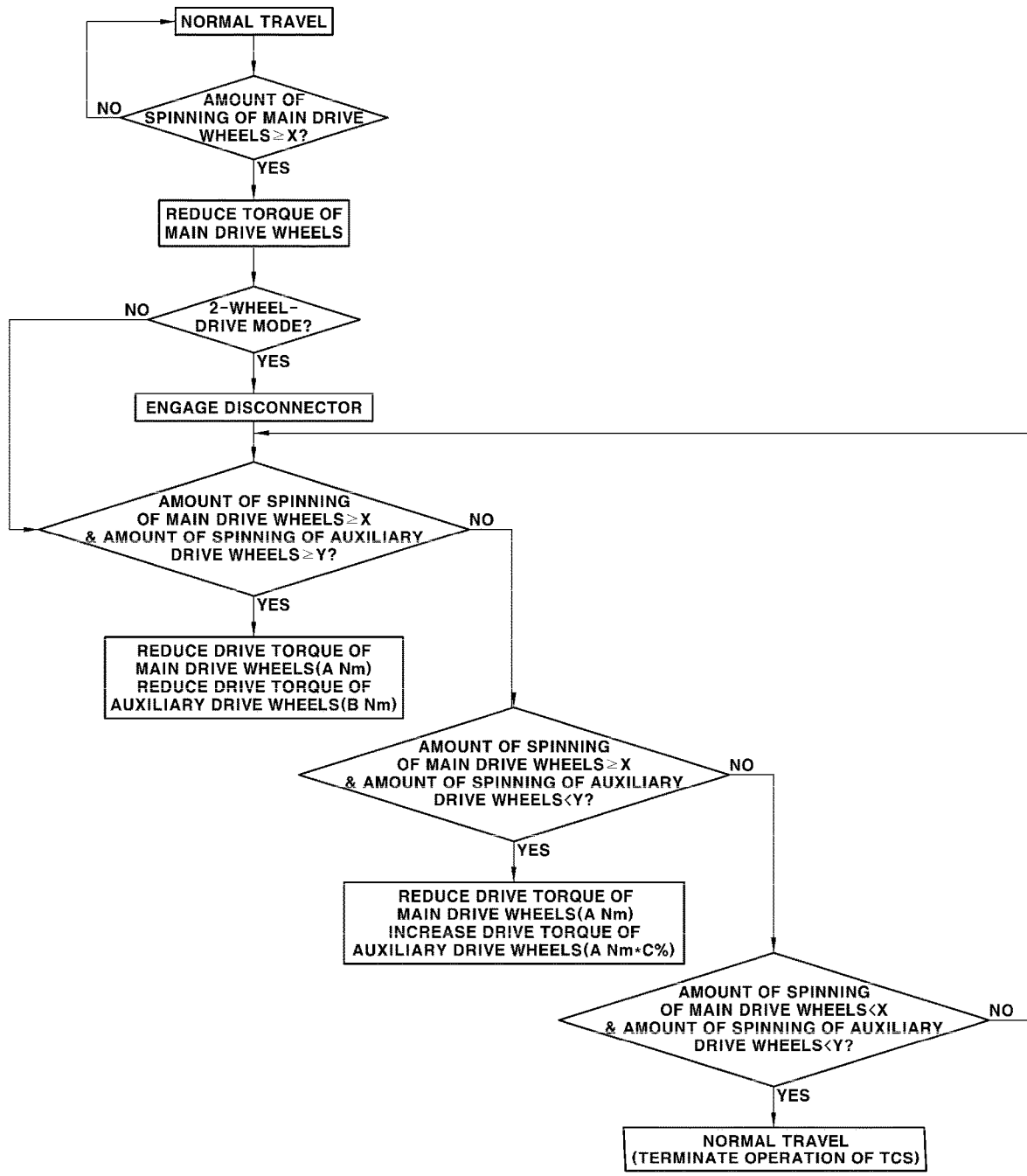
FIG. 6 is a flowchart showing a traction control method.

Referring to FIG. 6, it is determined through real-time monitoring whether the rear wheels 1 are spinning during normal travel of the vehicle. When the amount of spinning of the rear wheels 1 is equal to or greater than a predetermined rear-wheel threshold level "X", the brake controller 91 determines that the rear wheels 1 are spinning, and when the amount of spinning of the rear wheels 1 is less than the rear-wheel threshold level "X", the brake controller 91 determines that the rear wheels 1 are not spinning. During normal travel of the vehicle, traction control is not performed.

Upon determining that the rear wheels 1 are spinning, the brake controller 91 requests the motor controller 92 to reduce the torque of the rear motor 3. That is, upon determining that the amount of spinning of the rear wheels 1 is equal to or greater than the rear-wheel threshold level "X", the brake controller 91 transmits a command including information about required torque of the rear motor 3 and traction control start information to the motor controller 92 so as to primarily reduce the drive torque of the rear wheels 1.

Subsequently, the brake controller 91 determines whether the vehicle is traveling in a two-wheel-drive mode. The brake controller 91 may determine the drive mode of the vehicle based on information about the state of the disconnector 7, which is received from the motor controller 92. When the disconnector 7 is in a disengaged state, the brake controller 91 determines that the drive mode of the vehicle is a two-wheel-drive mode. When the vehicle is traveling in a two-wheel-drive mode, the brake controller 91 requests the motor controller 92 to engage the disconnector 7.

The motor controller 92 controls the disconnector 7 to change to an engaged state in response to a request from the brake controller 91. When engagement of the disconnector 7 is completed, the motor controller 92 transmits a signal including information about the engaged state of the disconnector 7 to the brake controller 91. When the engagement of the disconnector 7 is completed, the drive mode of the vehicle is changed from the two-wheel-drive mode to the four-wheel-drive mode.

When the engagement of the disconnector 7 is completed, the brake controller 91 requests the motor controller 92 to control the front motor 4 and the rear motor 3 individually based on the amount of spinning of the rear wheels 1 and the amount of spinning of the front wheels 2.

When the amount of spinning of the rear wheels 1 remains equal to or greater than the rear-wheel threshold level X after the engagement of the disconnector 7, the brake controller 91 secondarily reduces the drive torque of the rear wheels 1 through the motor controller 92. In this case, when the amount of spinning of the front wheels 2 is less than a predetermined front-wheel threshold level "Y", the brake controller 91 increases the drive torque of the front wheels 2 based on the amount of reduction in the drive torque of the rear wheels 1.

In other words, after the disconnector 7 is engaged, when the amount of spinning of the rear wheels 1 is equal to or greater than the rear-wheel threshold level "X" and the amount of spinning of the front wheels 2 is less than the front-wheel threshold level "Y", the brake controller 91 requests the motor controller 92 to reduce the drive torque of the rear wheels 1 and to increase the drive torque of the front wheels 2. To this end, the brake controller 91 transmits a command including information about the required torque of the front motor 4 and the required torque of the rear motor 3 to the motor controller 92.

In this case, the amount of increase in the drive torque of the front wheels 2 may be set in proportion to the amount of reduction in the drive torque of the rear wheels 1. That is, the amount of increase in the drive torque of the front wheels 2 may have a predetermined ratio relative to the amount of reduction in the drive torque of the rear wheels 1. The amount of increase in the drive torque of the front wheels 2 may be set to a level equal to or less than the amount of reduction in the drive torque of the rear wheels 1.

In addition, after the disconnector 7 is engaged, when the amount of spinning of the rear wheels 1 is equal to or greater than the rear-wheel threshold level "X" and the amount of spinning of the front wheels 2 is equal to or greater than the front-wheel threshold level "Y", the brake controller 91 requests the motor controller 92 to reduce the drive torque of the rear wheels 1 and the drive torque of the front wheels 2.

In this case, the amount of reduction in the drive torque of the rear wheels 1 and the amount of reduction in the drive torque of the front wheels 2 may be determined individually based on the amount of spinning of the rear wheels 1 and the amount of spinning of the front wheels 2.

In addition, after the disconnector 7 is engaged, when the amount of spinning of the rear wheels 1 is less than the rear-wheel threshold level "X" and the amount of spinning of the front wheels 2 is less than the front-wheel threshold level "Y", the brake controller 91 terminates the traction control and transmits a signal including traction control termination information to the motor controller 92.

When the traction control is terminated, the vehicle is driven in a normal drive mode.

As is apparent from the above description, the traction control device according to the exemplary forms of present disclosure has the following effects.

First, when wheel spin occurs during travel of a vehicle, the torque of a front motor and the torque of a rear motor are individually controlled, thereby securing the starting performance and acceleration performance of the vehicle on a low-friction road or a slope.

Second, when only the main drive wheels spin, the drive torque of auxiliary drive wheels is increased in proportion to the amount of reduction in the drive torque of the main drive wheels, thereby preventing or minimizing the reduction in the total drive torque of the vehicle and consequently securing the starting performance and acceleration performance of the vehicle.

Third, when the main drive wheels spin in a two-wheel-drive mode, a disconnector is engaged such that the drive mode of the vehicle is changed to a four-wheel-drive mode, thereby restraining spinning of the main drive wheels and improving the driving stability of the vehicle.

The present disclosure has been described in detail with reference to exemplary forms thereof. However, it will be appreciated by those skilled in the art that changes may be made in these forms without departing from the principles and spirit of the present disclosure.

What is claimed is:

1. A traction control device for a four-wheel drive electric vehicle, the traction control device comprising:
a first motor configured to supply a drive torque to main drive wheels of a four-wheel drive electric vehicle;
a second motor configured to supply a drive torque to auxiliary drive wheels of the four-wheel drive electric vehicle;
a disconnector provided at an axle of the auxiliary drive wheels, wherein the disconnector is configured to selectively connect the auxiliary drive wheels to the second motor so as to control power transmission between the auxiliary drive wheels and the second motor; and
a traction controller configured to control the first motor and the second motor,
wherein when the main drive wheels spin during travel of the four-wheel drive electric vehicle in a state in which the auxiliary drive wheels and the second motor are connected to each other by the disconnector, the traction controller is configured to:
reduce the drive torque of the main drive wheels, and
increase the drive torque of the auxiliary drive wheels in proportion to an amount of reduction in the drive torque of the main drive wheels, and
when both the main drive wheels and the auxiliary drive wheels spin in a state in which the disconnector is engaged, the traction controller is configured to reduce the drive torque of the main drive wheels and the drive torque of the auxiliary drive wheels.

2. The traction control device of claim 1, wherein, when the main drive wheels spin during travel of the four-wheel drive electric vehicle in a state in which the disconnector is disengaged, the traction controller is configured to reduce the drive torque of the main drive wheels, and engage the disconnector such that a drive torque is supplied to the auxiliary drive wheels.

3. The traction control device of claim 2, wherein, when an amount of spinning of the main drive wheels is equal to or greater than a predetermined first threshold level and an amount of spinning of the auxiliary drive wheels is equal to or greater than a predetermined second threshold level after the disconnector is engaged, the traction controller is configured to control the first motor to reduce the drive torque of the main drive wheels and control the second motor to reduce the drive torque of the auxiliary drive wheels.

4. The traction control device of claim 3, wherein the traction controller comprises:
a brake controller configured to determine a first required torque of the first motor and a second required torque of the second motor; and a motor controller configured to control a torque of the first motor to achieve the first required torque and control a torque of the second motor to achieve the second required torque.

5. The traction control device of claim 4, wherein, when the amount of spinning of the main drive wheels is less than the predetermined first threshold level and the amount of spinning of the auxiliary drive wheels is less than the predetermined second threshold level after the disconnector is engaged, the brake controller is configured to inform the motor controller that a command comprising information about the first required torque and the second required torque will not be transmitted to the motor controller.

6. The traction control device of claim 4, wherein, when the brake controller detects an occurrence of spinning of the main drive wheels, the motor controller is configured to control the disconnector to change to an engaged state.

7. The traction control device of claim 1, wherein an amount of increase in the drive torque of the auxiliary drive wheels is equal to or less than an amount of reduction in the drive torque of the main drive wheels.

8. The traction control device of claim 1, wherein the main drive wheels are rear wheels and the auxiliary drive wheels are front wheels.

9. A traction control method for a four-wheel drive electric vehicle, the traction control method comprising:
determining, by a brake controller, whether main drive wheels driven by a first motor are spinning during travel of a four-wheel drive electric vehicle;
upon determining that the main drive wheels are spinning, reducing, by the brake controller, a torque of the first motor and determining whether the four-wheel drive electric vehicle is traveling in a two-wheel-drive mode;
upon determining that the four-wheel drive electric vehicle is traveling in the two-wheel-drive mode, engaging a disconnector provided at an axle of auxiliary drive wheels such that auxiliary drive wheels of the four-wheel drive electric vehicle are connected to a second motor to receive a torque from the second motor;
upon determining that the main drive wheels are spinning, reducing, by the brake controller, the torque of the first motor and increasing the torque of the second motor in proportion to an amount of reduction in the torque of the first motor, and
upon determining that both the main drive wheels and the auxiliary drive wheels are spinning, reducing, by the brake controller, the torque of the first motor and the torque of the second motor.

10. The traction control method of claim 9, further comprising:
upon determining that an amount of spinning of the main drive wheels is equal to or greater than a predetermined first threshold level and an amount of spinning of the auxiliary drive wheels is equal to or greater than a predetermined second threshold level after engaging the disconnector, controlling, by the brake controller, the first motor to reduce the torque of the main drive wheels and controlling the second motor to reduce the torque of the auxiliary drive wheels.

11. The traction control method of claim 10, wherein the first motor is controlled by a motor controller so as to realize a first required torque determined by the brake controller, and
wherein the second motor is controlled by the motor controller so as to realize a second required torque determined by the brake controller.

12. The traction control method of claim 11, further comprising:
upon determining that the amount of spinning of the main drive wheels is less than the predetermined first threshold level and the amount of spinning of the auxiliary drive wheels is less than the predetermined second threshold level after engaging the disconnector, informing, by the brake controller, the motor controller that a command comprising information about the first required torque and the second required torque will not be transmitted to the motor controller.

13. The traction control method of claim 9, wherein an amount of increase in the torque of the second motor is equal to or less than an amount of reduction in the torque of the first motor.

14. The traction control method of claim 9, wherein the main drive wheels are rear wheels and the auxiliary drive wheels are front wheels.

* * * * *